United States Patent
Okuyama et al.

(10) Patent No.: US 8,109,637 B2
(45) Date of Patent: Feb. 7, 2012

(54) WAVELENGTH-SELECTIVE POLARIZATION CONVERSION ELEMENT FOR GENERATING TWO LIGHT COMPONENTS HAVING POLARIZATION DIRECTIONS AND WAVELENGTH REGIONS DIFFERENT FROM EACH OTHER, ILLUMINATION OPTICAL SYSTEM, AND IMAGE PROJECTION APPARATUS INCLUDING THE ELEMENT

(75) Inventors: Atsushi Okuyama, Tokorozawa (JP); Yu Yamauchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 599 days.

(21) Appl. No.: 12/134,328

(22) Filed: Jun. 6, 2008

(65) Prior Publication Data
US 2008/0316431 A1    Dec. 25, 2008

(30) Foreign Application Priority Data
Jun. 19, 2007    (JP) .................................. 2007-161918

(51) Int. Cl.
*G03B 21/14*    (2006.01)
(52) U.S. Cl. ........................................... 353/20; 353/38
(58) Field of Classification Search ................ 353/20, 353/38, 30, 31, 81; 359/483, 484, 583, 437, 359/629, 490, 639, 619, 620, 634; 348/338, 348/339
See application file for complete search history.

(56) References Cited

U.S. PATENT DOCUMENTS

| | | | |
|---|---|---|---|
| 6,176,583 B1 | 1/2001 | Sawai | |
| 6,246,526 B1 * | 6/2001 | Okuyama | 359/621 |
| 6,332,684 B1 * | 12/2001 | Shibatani et al. | 353/31 |
| 6,394,607 B1 * | 5/2002 | Hashizume et al. | 353/31 |
| 6,464,362 B1 * | 10/2002 | Sugawara et al. | 353/102 |
| 6,497,485 B1 * | 12/2002 | Itoh | 353/20 |
| 7,359,119 B2 * | 4/2008 | Facius | 359/489.07 |
| 2002/0114079 A1 * | 8/2002 | Ohuchi et al. | 359/619 |
| 2006/0114565 A1 * | 6/2006 | Le Hors et al. | 359/495 |
| 2008/0278690 A1 | 11/2008 | Maeda et al. | |

FOREIGN PATENT DOCUMENTS

| | | |
|---|---|---|
| EP | 1256824 A2 | 11/2002 |
| EP | 1612584 A1 | 1/2006 |
| EP | 1796399 A2 | 6/2007 |
| JP | 2000-009933 A | 1/2000 |
| JP | 2001-290216 A | 10/2001 |
| JP | 2007-079542 A | 3/2007 |
| WO | 2007/021015 A1 | 2/2007 |

OTHER PUBLICATIONS

European Patent Office Communication dated Sep. 17, 2008 concerning application 08010372.4-2217.

* cited by examiner

*Primary Examiner* — Que T Le
*Assistant Examiner* — Pascal M Bui Pho
(74) *Attorney, Agent, or Firm* — Canon U.S.A., Inc. IP Division

(57) ABSTRACT

The wavelength-selective polarization conversion element includes a plurality of polarization splitting surfaces each of which separates entering light into two polarized light components having polarization directions different from each other, a plurality of phase plates that causes a polarization direction of one polarized light component in the two polarized light components from the polarization splitting surfaces to coincide with a polarization direction of the other polarized light component. The element further includes a plurality of dichroic surfaces that is disposed closer to a light entrance side than the plurality of polarization splitting surfaces or between the plurality of polarization splitting surfaces and the plurality of phase plates, each dichroic surface separating entering light into two wavelength region components different from each other. The element is capable of generating light components having different polarization directions and different wavelength regions from non-polarized light while preventing a reduction of light use efficiency.

5 Claims, 8 Drawing Sheets

WAVELENGTH-SELECTIVE POLARIZATION CONVERSION ELEMENT FOR GENERATING TWO LIGHT COMPONENTS HAVING POLARIZATION DIRECTIONS AND WAVELENGTH REGIONS DIFFERENT FROM EACH OTHER, ILLUMINATION OPTICAL SYSTEM, AND IMAGE PROJECTION APPARATUS INCLUDING THE ELEMENT

BACKGROUND OF THE INVENTION

The present invention relates to a wavelength-selective polarization conversion element that generates two light components having polarization directions and wavelength regions different from each other from light entering thereinto, an illumination optical system equipped therewith and an image projection apparatus.

A so-called three-panel projector (image projection apparatus) performs a color-separation to separate white light emitted from a light source into three color light components (for example, a red light component, a green light component and a blue light component). And then, the color light components are introduced to three image-forming elements such as liquid crystal panels.

Japanese Patent Laid-Open No. 2000-9933 discloses the following three-panel projector. That is, in order to perform color-separation through a color separation optical system, the three-panel projector is provided with an illumination optical system. The illumination optical system generates two wavelength components having polarization directions different from each other (for example, P-polarized green light and S-polarized red and blue light) from non-polarized white light emitted from a light source.

The illumination optical system separates the non-polarized white light emitted from the light source into S-polarized red and green light and P-polarized blue light with a polarization splitting surface of a polarization beam splitting prism. And further, a half wave plate converts the P-polarized light into S-polarized light. The S-polarized red, green and blue light impinges on a polarization conversion dichroic mirror. The polarization conversion dichroic mirror converts only the S-polarized green light into P-polarized light. Thus, the P-polarized green light and the S-polarized red and blue light proceed to the color separation optical system.

The polarization conversion dichroic mirror includes a dichroic surface, a quarter-wave plate and a mirror surface in this order from a light entrance side. The dichroic surface transmits the S-polarized green light, and reflects the S-polarized red and blue light. The S-polarized green light passes through the dichroic surface, and passes twice through the quarter-wave plate before and after the reflection by the mirror surface. Thereby, the quarter-wave plate converts the S-polarized green light into P-polarized green light. With this arrangement, the P-polarized green light and the S-polarized red and blue light emerge from the polarization conversion dichroic mirror.

However, in the illumination optical system disclosed in the Japanese Patent Laid-Open No. 2000-9933, the red light component, green light component and blue light component entering into the polarization conversion dichroic mirror have to be previously converted into S-polarized light by the polarization beam splitting prism and the half wave plate. Guiding the light from the light source to the polarization conversion dichroic mirror via the polarization beam splitting prism and the half wave plate as described above decreases the use efficiency of the light. Also, since the configuration in which the light from the light source is reflected via the polarization beam splitting prism and the polarization conversion dichroic mirror is employed, the designing flexibility of the illumination optical system is restricted and the size of the illumination optical system tends to become larger.

BRIEF SUMMARY OF THE INVENTION

The present invention provides a wavelength-selective polarization conversion element capable of generating a plurality of light components having polarization directions and wavelength regions different from each other from non-polarized light while preventing a reduction of the use efficiency of the light with a compact configuration, an illumination optical system equipped therewith and an image projection apparatus.

The present invention provides, according to one aspect, a wavelength-selective polarization conversion element including a plurality of polarization splitting surfaces each of which separates entering light into two polarized light components having polarization directions different from each other, a plurality of phase plates that causes a polarization direction of one polarized light component in the two polarized light components from the polarization splitting surfaces to coincide with a polarization direction of the other polarized light component, and a plurality of dichroic surfaces that is disposed closer to a light entrance side than the plurality of polarization splitting surfaces or between the plurality of polarization splitting surfaces and the plurality of phase plates, each dichroic surface separating entering light into two wavelength region components different from each other.

The present invention provides, according to another aspect, a wavelength-selective polarization conversion element including a plurality of polarization splitting surfaces that is disposed along a first direction, a plurality of dichroic surfaces that is disposed along the first direction, and a plurality of phase plates that is disposed along the first direction. The plurality of polarization splitting surfaces and the plurality of dichroic surfaces separate non-polarized white light into a plurality of first light fluxes and a plurality of second light fluxes, the first light flux including light of a first color as S-polarized light, light of a second color as S-polarized light and light of a third color as P-polarized light, and the second light flux including light of the first color as P-polarized light, light of the second color as P-polarized light and light of the third color as S-polarized light. The plurality of phase plates causes a polarization direction of one light flux in the first and second light fluxes to coincide with a polarization direction of the other light flux.

The present invention provides, according to still another aspect, a wavelength-selective polarization conversion element including in order from a light entrance side, a plurality of first optical surfaces that is disposed along a first direction, a plurality of second optical surfaces that is disposed along the first direction, and a plurality of half-phase plate disposed along the first direction. Of the first optical surface and the second optical surface, one is a polarization splitting surface and the other is a dichroic surface. The half-phase plates are disposed at positions corresponding to every other second optical surface in the plurality of second optical surfaces disposed along the first direction.

The present invention provides, according to yet still another aspect, an illumination optical system including a lens array that divides light from a light source into a plurality of light fluxes, one of the above-described wavelength-selective polarization conversion elements into which the plurality of light fluxes from the lens array enters, and a collective optical system that collects the plurality of light fluxes from the wavelength-selective polarization conversion element so as to overlap the light fluxes with each other on an illumination surface.

The present invention provides, according to further still another aspect, an image projection apparatus including the illumination optical system, three image-forming elements each of which forms an original image, a color separating/combining optical system that separates two wavelength region components having polarization directions different from each other entering from the illumination optical system into three light components having wavelengths different from each other to introduce the three light components to the three image-forming elements, and combines the three light components from the three image-forming elements, and a projection optical system that projects the combined light from the color separating/combining optical system onto a projection surface.

Other aspects of the present invention will be apparent from the embodiments described below with reference to the drawings.

DETAILED DESCRIPTION OF THE EMBODIMENTS

Exemplary embodiments of the present invention will be described below with reference to the accompanied drawings.

Embodiment 1

Figure 18:
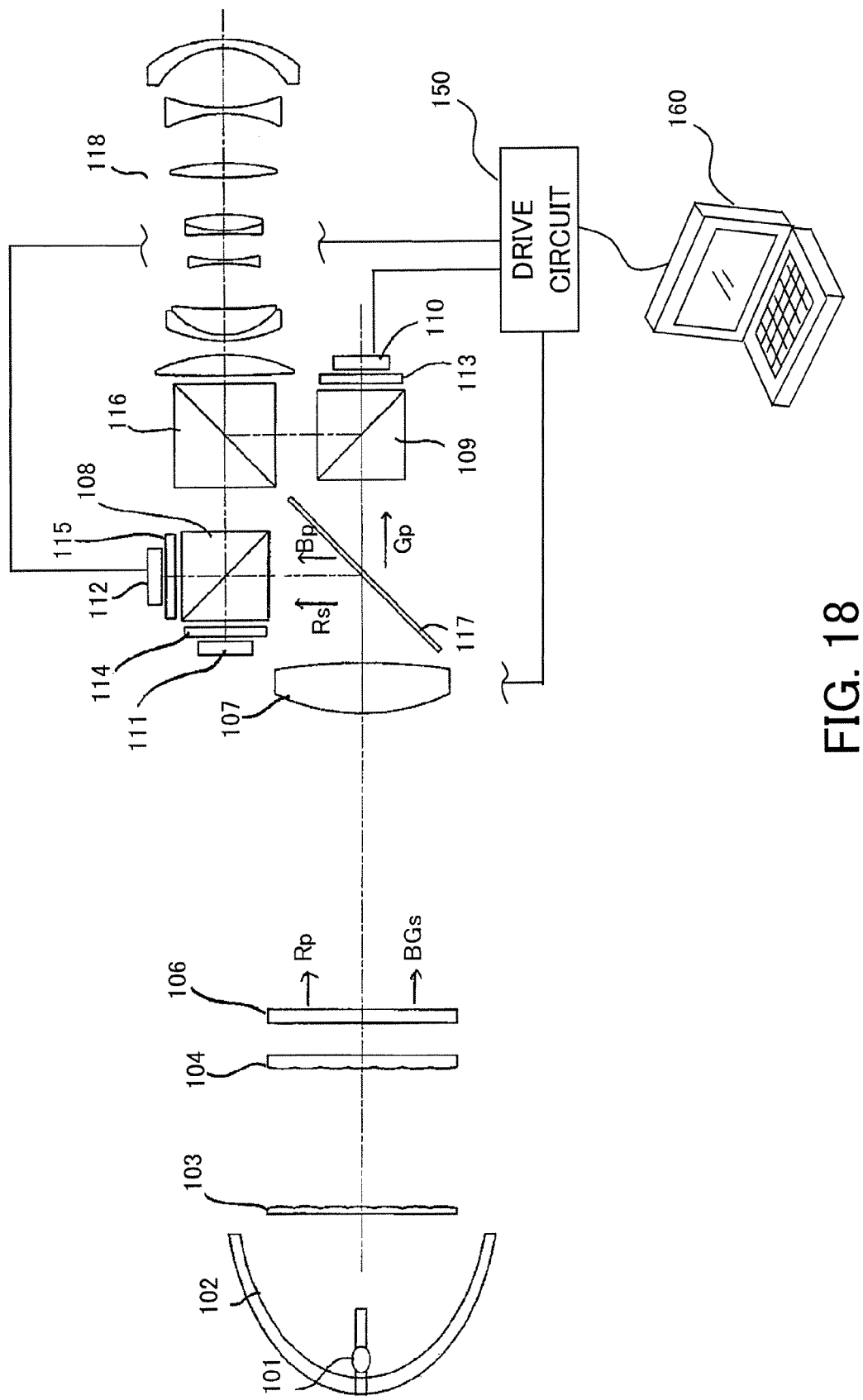
FIG. 18 illustrates the configuration of a projector using the dichroic polarization conversion array of Embodiment 1.

FIG. 18 illustrates the configuration of an optical unit in a projector (image projection apparatus) that employs a wavelength-selective polarization conversion element (hereinafter, referred to as a dichroic polarization conversion array) which is a first embodiment (Embodiment 1) of the present invention. In the following description, reference symbol R denotes red (red light including a wavelength region from 620 to 650 nm), reference symbol G denotes green (green light including a wavelength region from 520 to 550 nm), and reference symbol B denotes blue (blue light including a wavelength region from 450 to 480 nm). The blue light, red light and green light may be referred to as light of a first color, light of a second color and light of a third color, respectively.

Reference numeral 101 denotes a light source such as an ultra-high pressure mercury discharge tube that emits a white (substantially white) light flux having no specific polarization direction (non-polarized light). Reference numeral 102 denotes a reflector that collimates the light flux emitted from the light source 101. The light source 101 and the reflector 102 integrally constitute a light source lamp. The light source lamp is replaceable independently from the optical unit and is not a constituent element of the optical unit.

Reference numeral 103 denotes a first lens array, 104 a second lens array, and 106 the dichroic polarization conversion array as the wavelength-selective polarization conversion element. Reference numeral 107 denotes a condenser lens as a collective optical system. The constituent elements from the first lens array 103 through the condenser lens 107 constitute an illumination optical system.

Reference numeral 117 denotes a dichroic mirror (an optical element having a dichroic surface). Reference numeral 108 denotes an RB polarization beam splitter (hereinafter, referred to as an RB-PBS). This RB-PBS has the polarization splitting function of transmitting one of S-polarized light and P-polarized light in the wavelength regions of the red light and blue light and reflecting the other. The RB-PBS need not necessarily have that polarization splitting function in the wavelength region of the green light. Reference numeral 109 denotes a G polarization beam splitter (hereinafter, referred to as a G-PBS). Reference numeral 110 denotes a G reflective image-forming element, 111 an R reflective image-forming element, and 112 a B reflective image-forming element. A reflective liquid crystal display element is used as each of the image-forming elements. This embodiment gives an example in which a liquid crystal display element is used as the image-forming element. However, the present invention is not limited to the above, but a DMD (digital micro-mirror device) may be used as the image-forming element.

Each of the image-forming elements 110 to 112 is connected to a drive circuit 150. The drive circuit 150 is connected to an image supply apparatus 160 such as a personal computer, a DVD player, a TV tuner or the like. Receiving image signals from the image supply apparatus 160, the drive circuit 150 drives the respective image-forming elements 110 to 112 based on the image signals and causes the respective image-forming elements 110 to 112 to form respective color original images. The image supply apparatus 160 and a projector constitute an image display system.

Reference numeral 113 denotes a G half-phase plate, 114 an R half-phase plate, and 115 a B half-phase plate. Reference numeral 116 denotes a color-combining prism. Reference numeral 118 denotes a projection lens.

The non-polarized white light emitted from the light source 101 and entering into the illumination optical system via the reflector 102 is divided into a plurality of light fluxes by the first fly-eye lens 103. The plurality of light fluxes enters into the dichroic polarization conversion array 106 through the second fly-eye lens 104.

The dichroic polarization conversion array 106 is disposed at or adjacent to convergent points of the light fluxes converged by the first lens array 103.

In this embodiment, the dichroic polarization conversion array 106 generates two wavelength region components (two light components) from the non-polarized white light entering thereinto. That is, P-polarized R light (Rp) and S-polarized BG light (BGs) which have polarization directions different from each other are generated. The generated two light components emerge from the dichroic polarization conversion array 106. The configuration and optical function of the dichroic polarization conversion array 106 will be described later.

The plurality of light fluxes emerging from the dichroic polarization conversion array 106 proceeds to the dichroic mirror 117 through the condenser lens 107. The condenser lens 107 has a function to overlap the plurality of light fluxes with each other on each of the three image-forming elements 110 to 112 as illumination surfaces.

The dichroic mirror 117 transmits the G light (Gs) in the light coming from the condenser lens 107 and reflects the R light (Rp) and the B light (Bs) to thereby separate the G light and the R and B light from each other.

Practically, a dichroic film (dichroic surface) and a polarization splitting film (polarization splitting surface) in the dichroic polarization conversion array 106 are arranged to have the following relationship. That is, each of the dichroic film and polarization splitting film is twisted by 90° around an optical axis with respect to the dichroic mirror 117 in FIG. 18. With this arrangement, each of the polarized state of the respective color light components with respect to the dichroic mirror is exchanged. That is, the light entering the dichroic mirror 117 is separated into P-polarized G light (Gp), S-polarized R light (Rs) and P-polarized B light (Bp).

The G light is transmitted through the G-PBS 109, passes through the half-phase plate 113 and then enters into the G image-forming element 110. The G image-forming element 110 modulates the G light according to the original image and reflects the same. The modulated G light passes through the half-phase plate 113 again and enters into the G-PBS 109 as S-polarized light. The G-PBS 109 reflects the S-polarized G light toward the color-combining prism 116.

The R light reflected by the dichroic mirror 117 is reflected by the RB-PBS 108. The reflected R light passes through the half-phase plate 114 and enters into the R image-forming element 111. The R image forming element 111 modulates the R light according to the original image and reflects the same. The modulated R light passes through the half-phase plate 114 again and enters into the RB-PBS 108 as P-polarized light. The P-polarized R light is transmitted through the RB-PBS 108 to enter into the color-combining prism 116.

The B light reflected by the dichroic mirror 117 is transmitted through the RB-PBS 108, passes through the half-phase plate 115 and then enters into the B image-forming element 112. The B image-forming element 112 modulates the B light according to the original image and reflects the same. The modulated B light passes through the half-phase plate 115 again and enters into the RB-PBS 108 as S-polarized light. The RB-PBS 108 reflects the S-polarized B light toward the color-combining prism 116.

The color-combining prism 116 reflects the entering G light and transmits the entering R light and B light to combine the G light, R light and B light. The combined light emerges from the color-combining prism 116 toward the projection lens (projection optical system) 118. The projection lens 118 projects the combined light onto a projection surface such as a screen (not shown). The optical elements from the dichroic mirror 117 to the color-combining prism 116 constitute a color separating/combining optical system.

As described above, the dichroic polarization conversion array 106, the dichroic mirror 117 and the RB-PBS 108 separate the non-polarized white light from the light source 101 into three light components having wavelength regions and polarization directions different from each other.

Figure 1:
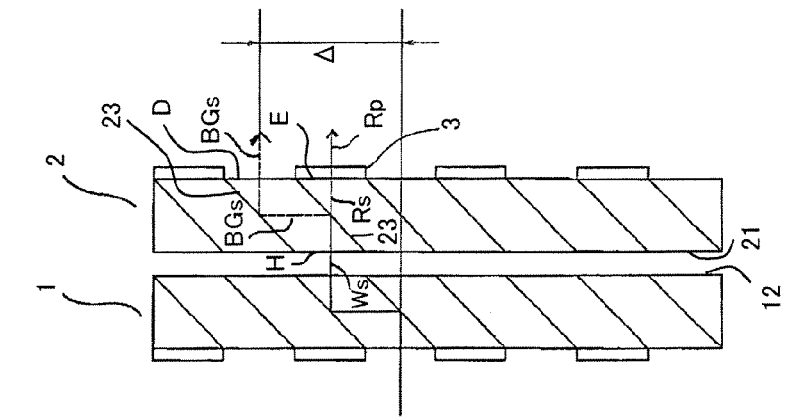
FIG. 1 is a sectional view showing the configuration of a dichroic polarization conversion array that is Embodiment 1 of the present invention.

FIG. 1 illustrates the configuration of the dichroic polarization conversion array 106 that is used in the above-described optical unit.

Referring to FIG. 1, reference numeral 1 denotes a polarization splitting array portion (first element portion), and 2 a dichroic array portion (second element portion). Reference numeral 3 denotes a half-phase plate provided at an exit surface side of the dichroic array portion 2. Reference numeral 4 denotes a light-shielding mask provided at an entrance surface side of the polarization splitting array portion 1. The polarization splitting array portion 1 and the dichroic array portion 2 are shown in a separated state in FIG. 1. However, actually, the polarization splitting array portion 1 and the dichroic array portion 2 are integrated being bonded or the like and are handled as one unit element.

The dichroic polarization conversion array 106 of this embodiment includes a plurality of polarization splitting films (polarization splitting surfaces) 13, a plurality of dichroic films (dichroic surfaces) 23 and a plurality of half-phase plates (half-wave plates) 3 which are disposed in this order from the light entrance side.

The plurality of polarization splitting films 13, the plurality of dichroic films 23 and the plurality of half-phase plates 3 are disposed along a direction (first direction, a vertical direction) perpendicular to a light-entering direction (from the left to the right in FIG. 1). Each polarization splitting film 13 and each dichroic film 23 are disposed being inclined (by 45°) with respect not only to the light-entering direction but also to a direction perpendicular to the light-entering direction. The half-phase plates 3 are disposed perpendicular to the light-entering direction (parallel to the direction perpendicular to the light-entering direction).

The polarization splitting surface and the dichroic surface are not limited to have a film structure, but may have a minute periodic structure or other structures. The half-phase plate may be formed as, not limited to a plate-like element, a film (single layered film or multi-layered film) or may have a minute periodic structure.

The polarization splitting array portion 1 has an entrance surface 11 and an exit surface 12 parallel to the entrance surface 11. Between the entrance surface 11 and the exit surface 12, the plurality of polarization splitting films 13 and the plurality of reflective films (reflective surface) 14 are provided. Each of these films 13 and 14 is formed to be inclined at an angle of 45° with respect to the entrance surface 11. The polarization splitting films 13 and the reflective films 14 are formed alternately in the direction perpendicular to the light-entering direction (first direction) and are parallel to each other. The polarization splitting films 13 can be replaced with the reflective films 14.

The entrance surface 11 includes a plurality of slit-like light-passing areas C. The light enters into the polarization splitting array portion 1 through the plurality of slit-like light-passing areas C and enters the plurality of polarization splitting films 13. In addition to the plurality of slit-like light-passing areas C, the entrance surface 11 includes a plurality of areas provided with the light-shielding masks 4. Like the half-phase plates, the plurality of light-shielding masks 4 is disposed along the direction perpendicular to the light-entering direction. Each of the light-shielding masks 4 is disposed parallel to the direction perpendicular to the light-entering direction.

The dichroic array portion 2 includes an entrance surface 21 and an exit surface 22 parallel to the entrance surface 21. Between the entrance surface 21 and the exit surface 22, the plurality of dichroic films 23 is provided in the direction perpendicular to the light-entering direction. Each of the dichroic films 23 is formed to be inclined at an angle of 45° with respect to the entrance surface 21. The exit surface 22 includes a plurality of slit-like light-passing areas D and E. From the plurality of slit-like light-passing areas D, the light transmitted through the plurality of dichroic film 23 emerge. From the plurality of slit-like light-passing areas E, the light reflected by the plurality of dichroic films 23 emerge.

Each of the light-passing areas E is provided with the half-phase plate 3. With this arrangement, the plurality of dichroic films 23 is disposed between the plurality of polarization splitting films 13 and the plurality of phase plates 3.

A pitch b between the polarization splitting film 13 and the reflective film 14 in the polarization splitting array portion 1 and a pitch a between the dichroic films 23 in the dichroic array portion 2 are equal to each other. Slit-like light-passing areas B1 on the exit surface 12 of the polarization splitting array portion 1 and slit-like light-passing areas A on the entrance surface 21 of the dichroic array portion 2 are disposed closely facing each other. The light transmitted through the polarization splitting film 13 emerges from the slit-like light-passing area B1 and enters the dichroic array portion 2 through the slit-like light-passing area A.

Slit-like light-passing areas F on the exit surface 12 of the polarization splitting array portion 1 and slit-like light-passing areas H on the entrance surface 21 of the dichroic array portion 2 are also disposed closely facing each other. The light reflected by the polarization splitting film 13 and the reflective film 14 emerges from the slit-like light-passing area F and enters the dichroic array portion 2 through the slit-like light-passing area H.

The polarization splitting film 13 of the polarization splitting array portion 1 has a function to separate the entering light into two polarized light components having polarization directions different from each other. To be more precisely, the polarization splitting film 13 has a characteristic to transmit the P-polarized light included in the entering light, and to reflect the S-polarized light included in the same. Therefore, the reflective film 14 reflects the S-polarized light.

Figure 5:
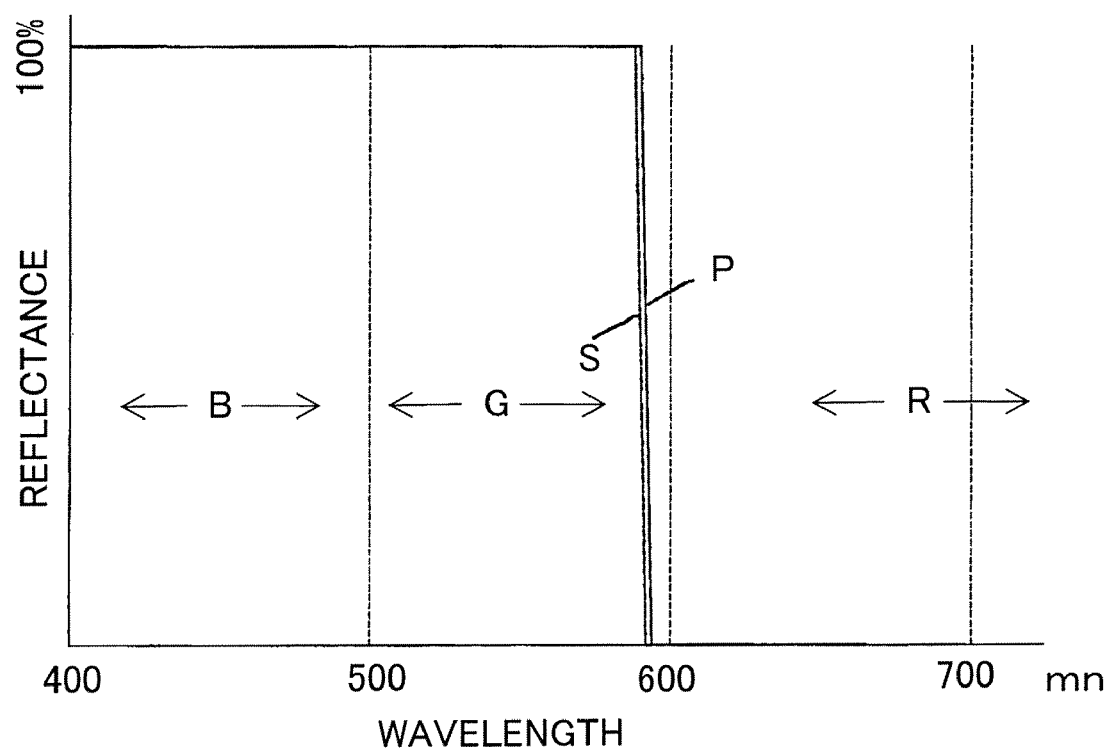
FIG. 5 illustrates characteristics of a dichroic film used in the dichroic polarization conversion array.

The dichroic film 23 of the dichroic array portion 2 separates the entering light into two wavelength region components different from each other. To be more precisely, the dichroic film 23 transmits the R light included in the entering light and reflects the B and G light included in the same as shown in FIG. 5.

The half-phase plate 3 converts the polarization direction of one polarized light component of the two polarized light components from the polarization splitting film 13 to cause the polarization direction of the one polarized light component to coincide with that of the other polarized light component. In this embodiment, the half-phase plate 3 is arranged so that its fast axis is inclined to a direction of 45° with respect to a longitudinal direction of the light-passing area E.

With this arrangement, the half-phase plate 3 rotates the polarization direction of the light entering thereinto as P-polarized light by 90° and allows the light to emerge therefrom as S-polarized light. And the half-phase plate 3 rotates the polarization direction of the light entering thereinto as S-polarized light by 90° and allows the light to emerge therefrom as P-polarized light.

Next, the optical function of the dichroic polarization conversion array 106 is described below with reference to FIGS. 2 to 4.

Figure 2:
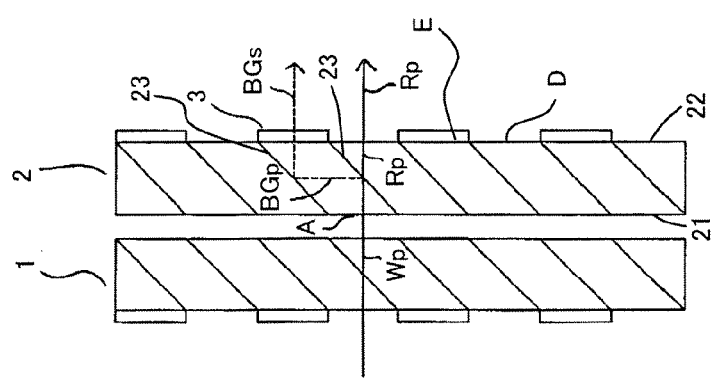
FIGS. 2 to 4 are sectional views illustrating the optical function of the dichroic polarization conversion array of Embodiment 1.

Referring to FIG. 2, reference symbol Wn denotes non-polarized white light. The polarization splitting film 13 of the polarization splitting array portion 1 separates the non-polarized white light Wn into P-polarized white light Wp and S-polarized white light Ws. The P-polarized white light Wp, after being transmitted through the polarization splitting film 13, emerges from the light-passing area B1 on the exit surface 12 of the polarization splitting array portion 1.

On the other hand, the S-polarized white light Ws is, after being reflected by the polarization splitting film 13, reflected by the reflective film 14 toward the same direction as that of the P-polarized white light Wp. The S-polarized white light Ws emerges from the light-passing area F next to the light-passing area B1 from which the P-polarized white light Wp emerges.

Figure 3:
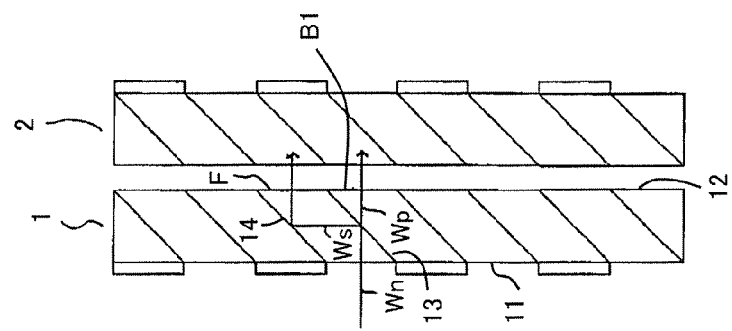

Referring to FIG. 3, the P-polarized white light Wp enters into the dichroic array portion 2 through the light-passing area A on the entrance surface 21 thereof. The dichroic film 23 separates the P-polarized white light Wp into P-polarized red light Rp and P-polarized blue and green light (hereinafter, the blue and green light is referred to as blue/green light) BGp. The P-polarized red light Rp, after being transmitted through the dichroic film 23, emerges from the light-passing area D on the exit surface 22 of the dichroic array portion 2.

On the other hand, the P-polarized blue/green light BGp is, after being reflected by the dichroic film 23, reflected by the next dichroic film 23 toward the same direction as that of the P-polarized red light Rp. The P-polarized blue/green light BGp emerges from the light-passing area E next to the light-passing area D on the exit surface 22 of the dichroic array portion 2 from which the P-polarized red light Rp emerges. The P-polarized blue/green light BGp is converted into S-polarized light blue/green light BGs by passing through the half-phase plate 3.

Figure 4:
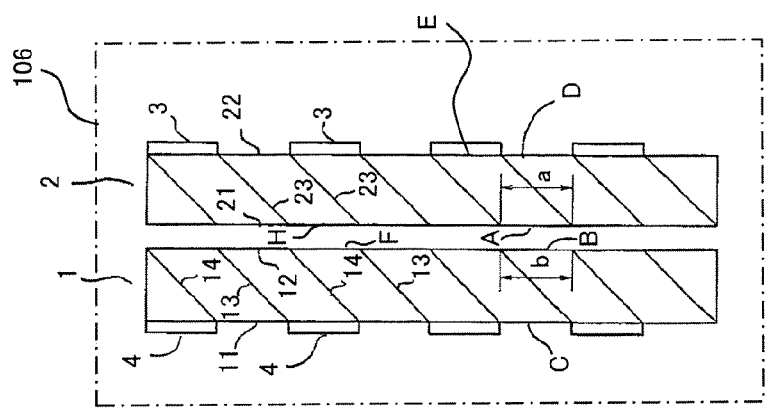

Referring to FIG. 4, the S-polarized white light Ws enters into the dichroic array portion 2 through the light-passing area H different from the light-passing area through which the P-polarized white light Wp enters. The dichroic film 23 separates the S-polarized white light Ws into S-polarized red light Rs and S-polarized blue/green light BGs. The S-polarized red light Rs, after being transmitted through the dichroic film 23, emerges from the light-passing area E on the exit surface 22 of the dichroic array portion 2. The S-polarized red light Rs is converted into P-polarized red light Rp by passing through the half-phase plate 3.

The S-polarized blue/green light BGs is, after being reflected by the dichroic film 23, reflected by the dichroic film 23 next thereto toward the same direction as that of the S-polarized red light Rs and then emerges from the light-passing area D next to the light-passing area E from which the S-polarized red light Rs emerges.

As described above with reference to FIGS. 2 to 4, the S-polarized blue light (light of the first color), the S-polarized green light (light of the second color) and the P-polarized red light (light of the third color) pass through the light-passing area D as one light flux (first light flux). As a result, each of these color light components emerges from the dichroic polarization conversion array 106 while maintaining its polarized state before passing through the light-passing area D (polarized state when being combined as the first light flux).

The P-polarized blue light (light of the first color), the P-polarized green light (light of the second color) and the S-polarized red light (light of the third color) enter as one light flux (second light flux) into the light-passing area E where the half-phase plate 3 is disposed. As a result, the polarization direction of each of these color light components is rotated by 90° by the function of the half-phase plate 3. Thereby, the P-polarized blue light, the P-polarized green light and the S-polarized red light are converted into S-polarized blue light (light of the first color), S-polarized green light (light of the second color) and P-polarized red light (light of the third color). These S-polarized blue light, the S-polarized green light and the P-polarized red light emerge from the wavelength-selective polarization conversion array 106.

As described above, at a point immediately before the light passes through the light-passing areas D and E, the light flux passing through the light-passing area D and the light flux passing through the light-passing area E are respectively converted into the first light flux in which three color light components are combined and the second light flux in which three color light components having polarization directions different from those in the first light flux are combined. One of the two light fluxes (first and second light fluxes) that enters into the light-passing area D or E is given with a 90° phase difference by the function of the half-phase plate 3; thereby the polarization directions of the light components of the same color in the two light fluxes are coincided with each other.

As described above, the P-polarized red light Rp and the S-polarized blue/green light BGs are generated from the non-polarized white light Wn. Thus, the dichroic polarization conversion array 106 of this embodiment can efficiently use the light from the light source 101.

In this embodiment, each of the blue light (light of the first color) and the green light (light of the second color) is converted into S-polarized light, and the red light (light of the third color) is converted into P-polarized light. However, the present invention is not limited to the above. The S-polarized light and the P-polarized light may be exchanged each other. Also, it may be arranged so that only the blue light is converted into S-polarized light and the green light and the red light are converted into P-polarized light. Here, the "S-polarized light" and the "P-polarized light" mean S-polarized light and P-polarized light with respect to the polarization splitting surface of the dichroic polarization conversion array 106.

Recently, there has been proposed a film element having the similar function to that of the dichroic polarization conversion array 106. However, the dichroic polarization conversion array 106 of this embodiment can use a base member made of glass. Therefore, the dichroic polarization conversion array 106 has a high heat resistance in a high-intensity projector.

Generally, a stretched film is used for the half-phase plate 3. However, in order to increase the heat resistance, a grating element having a sub-wavelength structure may be employed.

In this embodiment, along the first direction (it may be a direction across the optical axis of the illumination optical system), the plurality of light-shielding masks (light shielding members), the plurality of polarization splitting surfaces (first optical surfaces), the plurality of dichroic surfaces (second optical surfaces) and the plurality of half-phase plates are disposed in this order from the light entrance side.

The plurality of polarization splitting surfaces disposed closer to the light entrance side than the plurality of dichroic surfaces is disposed alternately with the plurality of reflective surfaces. The dichroic surfaces disposed closer to the light exit side than the polarization splitting surfaces are continuously disposed such that the reflective surface is not interposed therebetween. The light-shielding masks and the half-phase plates are disposed at the positions corresponding to those of the plurality of reflective surfaces; i.e., the positions corresponding to the positions where no polarization splitting surfaces (first optical surfaces) exists.

That is, the light-shielding masks and the half-phase plates are disposed at the positions corresponding to every other one of the plurality of dichroic surfaces disposed along the first direction. In other words, when the half-phase plate is disposed on the light exit side of the dichroic surface disposed at a certain position, the half-phase plate is not disposed on the light exit side of the two dichroic surfaces each neighboring to the dichroic surface disposed at the certain position. In further other words, the half-phase plate is disposed on the light exit side of the dichroic surface neighboring to the dichroic surface on the light exit side of which no half-phase plate is disposed.

Furthermore, in this embodiment, the first optical surface disposed on the light entrance side is the polarization splitting surface, and the second optical surface disposed on the light exit side is the dichroic surface. However, the order of the polarization splitting surface and the dichroic surface may be inverted (refer to Embodiment 3 described later, for example). That is, the dichroic surfaces as the first optical surfaces disposed on the light entrance side may be disposed alternately with the reflecting surfaces, and the plurality of polarization splitting surfaces as the second optical surfaces may be continuously disposed such that no reflective surface is interposed therebetween at positions closer to the light exit side than the dichroic surfaces.

Embodiment 2

Figure 6:
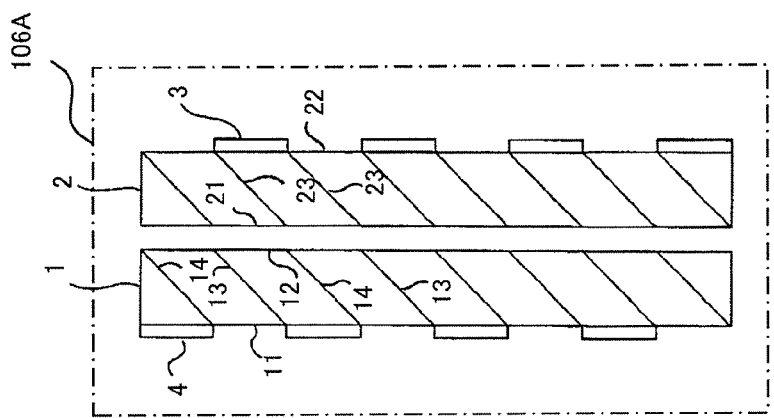
FIG. 6 is a sectional view showing the configuration of a dichroic polarization conversion array that is Embodiment 2 of the present invention.

FIG. 6 illustrates a dichroic polarization conversion array that is a second embodiment (Embodiment 2) of the present invention. Compared to the dichroic polarization conversion array 106 of Embodiment 1, the dichroic polarization conversion array 106A of this embodiment is different in the light-passing areas where the half-phase plates 3 are provided. The dichroic polarization conversion array 106A of this embodiment generates S-polarized red light and P-polarized blue and green light. The other configurations of the dichroic polarization conversion array 106A are identical to those of the dichroic polarization conversion array 106 of Embodiment 1. Constituent elements in this embodiment identical to those in Embodiment 1 are denoted with the same reference numerals as those in Embodiment 1.

The dichroic polarization conversion array 106A of this embodiment is used in an optical unit similar to that of the projector described in Embodiment 1 excepting the relationship between the reflection and the transmission at the polarization beam splitter due to the difference of the polarization directions.

The optical function of the dichroic polarization conversion array 106A of this embodiment is described with reference to FIGS. 7 to 9.

Figure 7:
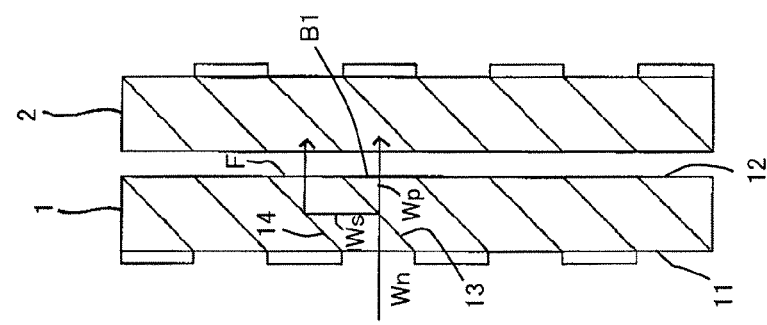
FIGS. 7 to 9 are sectional views illustrating the optical function of the dichroic polarization conversion array of Embodiment 2.

Referring to FIG. 7, non-polarized white light Wn is first separated into P-polarized white light Wp and S-polarized white light Ws by the polarization splitting films (polarization splitting surfaces) 13 of the polarization splitting array portion 1. The P-polarized white light Wp transmitted through the polarization splitting film 13 emerges from the light-passing area B1 on the exit surface 12 of the polarization splitting array portion 1.

On the other hand, the S-polarized white light Ws reflected by the polarization splitting film 13 is reflected by the reflective film 14 toward the same direction as that of the P-polarized white light Wp. The S-polarized white light Ws emerges from the light-passing area F next to the light-passing area B1 from which the P-polarized white light Wp emerges.

Figure 8:
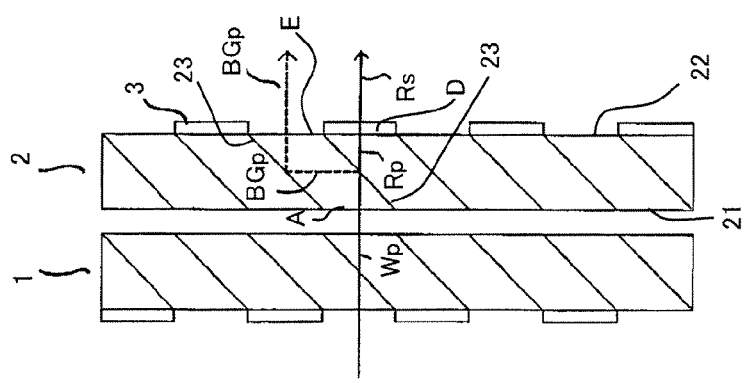

Referring to FIG. 8, the P-polarized white light Wp enters into the dichroic array portion 2 through the light-passing area A on the entrance surface 21. The entering P-polarized white light Wp is separated into P-polarized red light Rp and P-polarized blue/green light BGp by the dichroic film (dichroic surface) 23. The P-polarized red light Rp transmitted through the dichroic film 23 emerges from the light-passing area D on the exit surface 22 of the dichroic array portion 2. The P-polarized red light Rp is converted into S-polarized red light Rs by passing through the half-phase plate 3.

On the other hand, the P-polarized blue/green light BGp reflected by the dichroic film 23 is reflected by the dichroic film 23 next thereto toward the same direction as that of the P-polarized red light Rp. The P-polarized blue/green light BGp emerges from the light-passing area E next to the light-passing area D from which the P-polarized red light Rp emerges on the exit surface 22 of the dichroic array portion 2.

Figure 9:
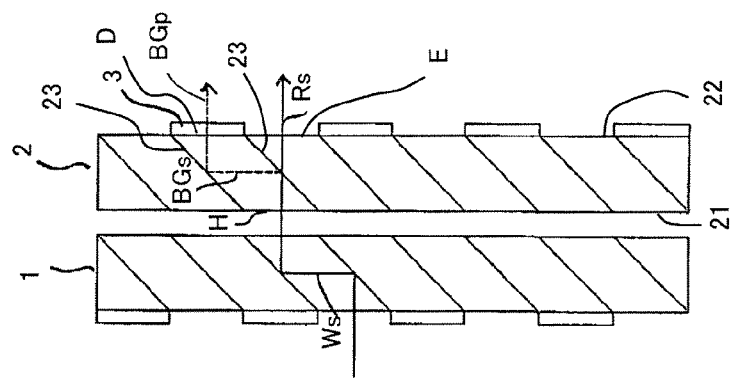

As shown in FIG. 9, the S-polarized white light Ws enters into the dichroic array portion 2 through a light-passing area H different from the light-passing area through which the P-polarized white light Wp enters. The S-polarized white light Ws is separated into S-polarized red light Rs and S-polarized blue/green light BGs by the dichroic film 23. The S-polarized red light Rs transmitted through the dichroic film 23 emerges from the light-passing area E on the exit surface 22 of the dichroic array portion 2. The S-polarized blue/green light BGs reflected by the dichroic film 23 is reflected by the dichroic film 23 next thereto toward the same direction as that of the S-polarized red light Rs.

The S-polarized blue/green light BGs emerges from the light-passing area D next to the light-passing area E from which the S-polarized red light Rs emerges. The S-polarized blue/green light BGs is converted into P-polarized blue/green light BGp by passing through the half-phase plate 3.

As described above, the S-polarized red light Rs and the P-polarized blue/green light BGp are generated from the non-polarized white light Wn. Thus, the light from the light source 101 can be efficiently used by the dichroic polarization conversion array 106A of this embodiment.

Embodiment 3

Figure 10:
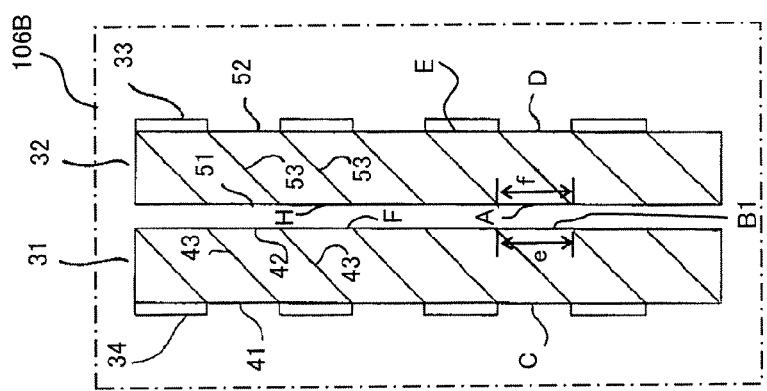
FIG. 10 is a sectional view showing the configuration of a dichroic polarization conversion array that is Embodiment 3 of the present invention.

FIG. 10 illustrates a dichroic polarization conversion array that is a third embodiment (Embodiment 3) of the present invention. The dichroic polarization conversion array 106B of this embodiment is used in an optical unit same as that used in the projector described in Embodiment 1.

Referring to FIG. 10, reference numeral 31 denotes a dichroic array portion (first element portion), and 32 a polarization splitting array portion (second element portion). Reference numeral 33 denotes half-phase plates provided on an exit surface side of the polarization splitting array portion 32, and 34 light-shielding masks provided on an entrance surface side of the dichroic array portion 31.

FIG. 10 illustrates the dichroic array portion 31 and the polarization splitting array portion 32 in a state being separated from each other. However, actually, the dichroic array portion 31 and the polarization splitting array portion 32 are integrated by adhesion or the like and are handled as one unit element.

The dichroic polarization conversion array 106B of this embodiment includes a plurality of dichroic films (dichroic surfaces) 43, a plurality of polarization splitting films (polarization splitting surfaces) 53 and a plurality of half-phase plates 33 that are disposed from the light entrance side in this order.

The dichroic array portion 31 includes an entrance surface 41 and an exit surface 42 that is parallel to the entrance surface 41. Between the entrance surface 41 and the exit surface 42, the plurality of dichroic films 43 is provided in a direction perpendicular to a light-entering direction (the left to the right in the figure). The dichroic films 43 are formed with an angle of 45° with respect to the entrance surface 41 and in parallel to each other. The plurality of light-shielding masks 34 is attached to the entrance surface 41 in a plurality of areas other than slit-like light-passing areas through which the light enters into the dichroic film 43.

The polarization splitting array portion 32 includes an entrance surface 51 and an exit surface 52 that is parallel to the entrance surface 51. Between the entrance surface 51 and the exit surface 52, the plurality of polarization splitting films 53 is formed in the direction perpendicular to the light-entering direction. The plurality of polarization splitting films 53 are formed with an angle of 45° with respect to the entrance surface 51. The exit surface 52 includes a plurality of slit-like light-passing areas D and a plurality of slit-like light-passing areas E. From the light-passing area D, the light transmitted through the polarization splitting film 53 emerges. From the light-passing area E, the light reflected by the dichroic films 43 emerges.

The plurality of half-wave plates 33 are attached to the light-passing areas E. With this arrangement, the plurality of dichroic films 43 is disposed closer to the light entrance side than the plurality of polarization splitting films 53.

A pitch e between the dichroic films 43 in the dichroic array portion 31 and a pitch f between the polarization splitting films 53 in the polarization splitting array portion 32 are equal to each other. The light transmitted through the dichroic film 43 emerges from a slit-like light-passing area B1 on the exit surface 42 of the dichroic array portion 31. The light emerging from the slit-like light-passing area B1 enters the polarization splitting array portion 32 through a slit-like light-passing area A on the entrance surface 51 of the polarization splitting array portion 32. The slit-like light-passing area B1 and the slit-like light-passing area A are disposed closely facing each other.

The light reflected by the dichroic film 43 emerges from a slit-like light-passing area F on the exit surface 42 of the dichroic array portion 31. The light from the slit-like light-passing area F enters the polarization splitting array portion 32 through a slit-like light-passing area H on the entrance surface 51 thereof. The slit-like light-passing area F and the slit-like light-passing area H are disposed closely facing each other.

The dichroic film 43 in the dichroic array portion 31 separates the entering light into two wavelength region components different from each other. To be more precisely, the dichroic film 43 has a characteristic to transmit R light in the entering light and reflects the B and G light in the same as shown in FIG. 5.

The polarization splitting film 53 in the polarization splitting array portion 32 has a function to separate the entering light into two polarized light components having polarization directions different from each other. To be more precisely, the polarization splitting film 53 has a characteristic to transmit the P-polarized light in the entering light and to reflect the S-polarized light in the same.

The half-phase plate 33 converts the polarization direction of one polarized light component of the two polarized light components from the polarization splitting film 53 to cause the polarization direction of the one polarized light component to coincide with that of the other polarized light component.

In this embodiment, the half-phase plate 33 is provided such that its fast axis is inclined to a direction of 45° with respect to a longitudinal direction of the slit light-passing area E. With this arrangement, the half-phase plate 33 rotates the polarization direction of the light entering thereinto as S-polarized light by 90° and allows the light to emerge therefrom as P-polarized light.

The optical function of the dichroic polarization conversion array 106B is described with reference to FIGS. 11 to 13.

Figure 11:
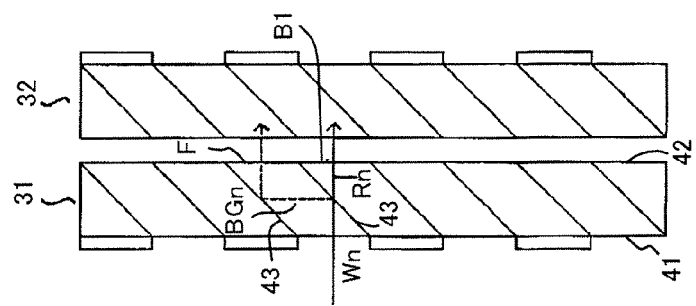

Referring to FIG. 11, reference symbol Wn denotes non-polarized white light. The non-polarized white light Wn enters into the dichroic array portion 31 through the light-passing area on the entrance surface 41 of the dichroic array portion 31. The dichroic film 43 separates the entering light into non-polarized red light Rn and non-polarized blue/green light BGn. The non-polarized red light Rn transmitted through the dichroic film 43 emerges from the light-passing area B1 on the exit surface 42 of the dichroic array portion 31.

The non-polarized blue/green light BGn reflected by the dichroic film 43 is reflected again by the dichroic film 43 next thereto toward the same direction as that of the non-polarized red light Rn. The non-polarized blue/green light BGn emerges from the light-passing area F next to the light-passing area B1 from which the non-polarized red light Rn emerges.

Figure 12:
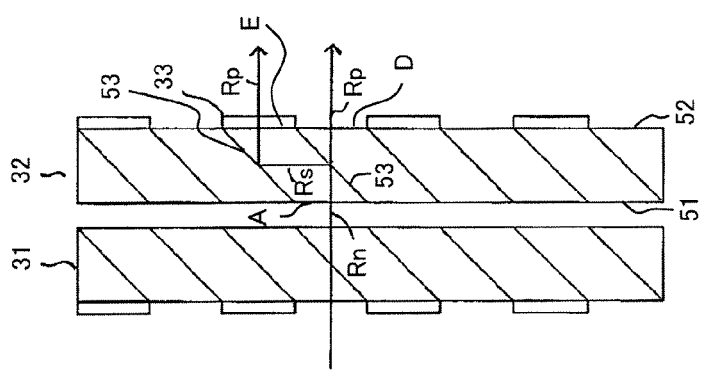

Referring to FIG. 12, the non-polarized red light Rn enters into the polarization splitting array portion 32 through the light-passing area A on the entrance surface 51 of the polarization splitting array portion 32. The polarization splitting film 53 separates the entering light into P-polarized red light Rp and S-polarized red light Rs. The P-polarized red light Rp transmitted through the polarization splitting film 53 emerges from the light-passing area D on the exit surface 52 of the polarization splitting array portion 32.

On the other hand, the S-polarized red light Rs reflected by the polarization splitting film 53 is reflected again by the polarization splitting film 53 next thereto toward the same direction as that of the P-polarized red light Rp. The S-polarized red light Rs emerges from the light-passing area E next to the light-passing area D from which the P-polarized red light Rp emerges. The S-polarized red light Rs is converted into P-polarized red light Rp by passing through the half-phase plate 33.

Figure 13:
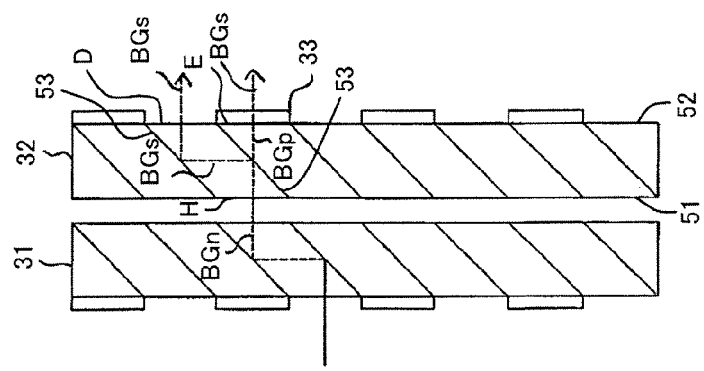
FIGS. 11 to 13 are sectional views illustrating the optical function of the dichroic polarization conversion array of Embodiment 3.

Referring to FIG. 13, the non-polarized blue/green light BGn enters into the polarization splitting array portion 32 through the light-passing area H different from the light-passing area where the red light Rn enters therethrough. The polarization splitting film 53 separates the non-polarized blue/green light BGn into P-polarized blue/green light BGp and S-polarized blue/green light BGs. The P-polarized blue/green light BGp transmitted through the polarization splitting film 53 emerges from the light-passing area E on the exit surface 52. The P-polarized blue/green light BGp passes through the half-phase plate 33, thereby being converted into S-polarized blue/green light BGs.

The S-polarized blue/green light BGs reflected by the polarization splitting film 53 is reflected again by the polarization splitting film 53 next thereto toward the same direction as that of the P-polarized blue/green light BGp. The S-polarized blue/green light BGs emerges from the light-passing area D next to the light-passing area E from which the P-polarized blue/green light BGp emerges.

As described above, the P-polarized red light Rp and the S-polarized blue/green light BGs are generated from the non-polarized white light Wn. Thus, the dichroic polarization conversion array 106B of this embodiment enables efficient use of the light from the light source 101.

In the above-described embodiments, the cases in which the red light and the blue/green light having different polarization directions are generated were described. However, depending on the characteristics of the dichroic film formed in the dichroic polarization conversion array, any combinations of the color light that is separated and the polarization direction thereof can be selected.

Embodiment 4

Figure 14:
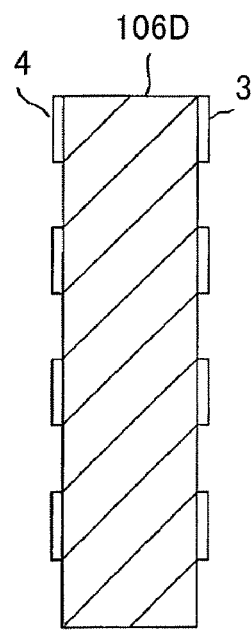
FIG. 14 is a sectional view showing the configuration of a dichroic polarization conversion array that is Embodiment 4 of the present invention.

FIG. 14 illustrates a dichroic polarization conversion array that is a fourth embodiment (Embodiment 4) of the present invention. The dichroic polarization conversion array 106D of this embodiment is manufactured as an integral element unlike those of Embodiment 1 (to 3) in which the polarization splitting array portion and the dichroic array portion are joined to each other afterward. The optical function of the dichroic polarization conversion array 106D is identical to that of the dichroic polarization conversion array 106 of Embodiment 1.

Figure 15:
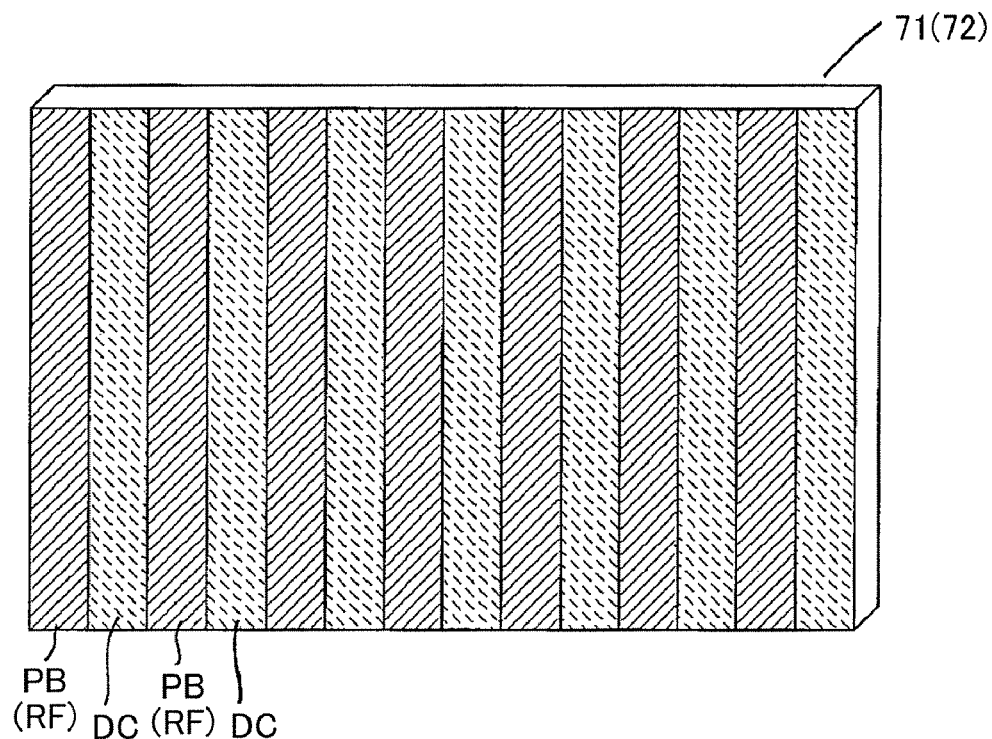
FIGS. 15 and 16 illustrate a manufacturing method of the dichroic polarization conversion array of Embodiment 4.

A manufacturing method of the dichroic polarization conversion array 106D of this embodiment 4 is briefly described. First, a substrate 71 is prepared in which polarization splitting film portions PB and dichroic film portions DC are formed alternately in a specific direction (first direction) on the same surface of a glass substrate as shown in FIG. 15. Further, a substrate 72 is prepared in which reflective film portions RF and dichroic film portions DC are formed alternately in the specific direction on the same surface of another glass substrate.

Figure 16:
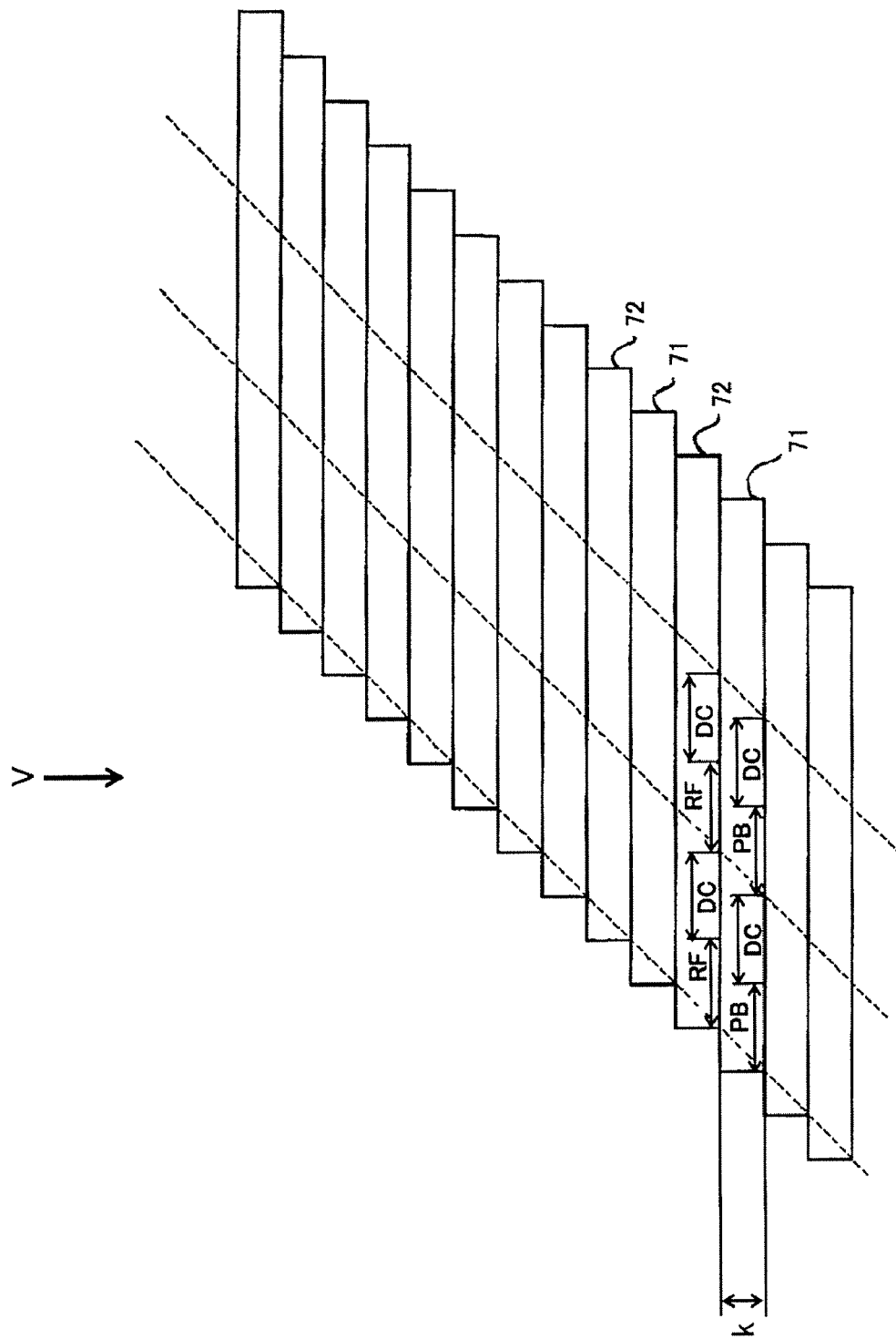

Then, as shown in FIG. 16, the substrates 71 and 72 are attached (overlapped) alternately to each other so that the positions of the polarization splitting film portion PB (or positions of the reflective film portion RF) and the dichroic film portion DC are displaced by a half pitch as viewed from a vertical direction V in FIG. 16.

The attached substrates 71 and 72 are cut in a direction of 45° with respect to the overlapping direction along dotted lines shown in FIG. 16. The width of the films PB, RF and DC is set to be twice the thickness k of each substrate.

With this manufacturing method, the dichroic polarization conversion array having an optical function similar to that in Embodiment 1 (to 3) can be easily manufactured.

Embodiment 5

Figure 17:
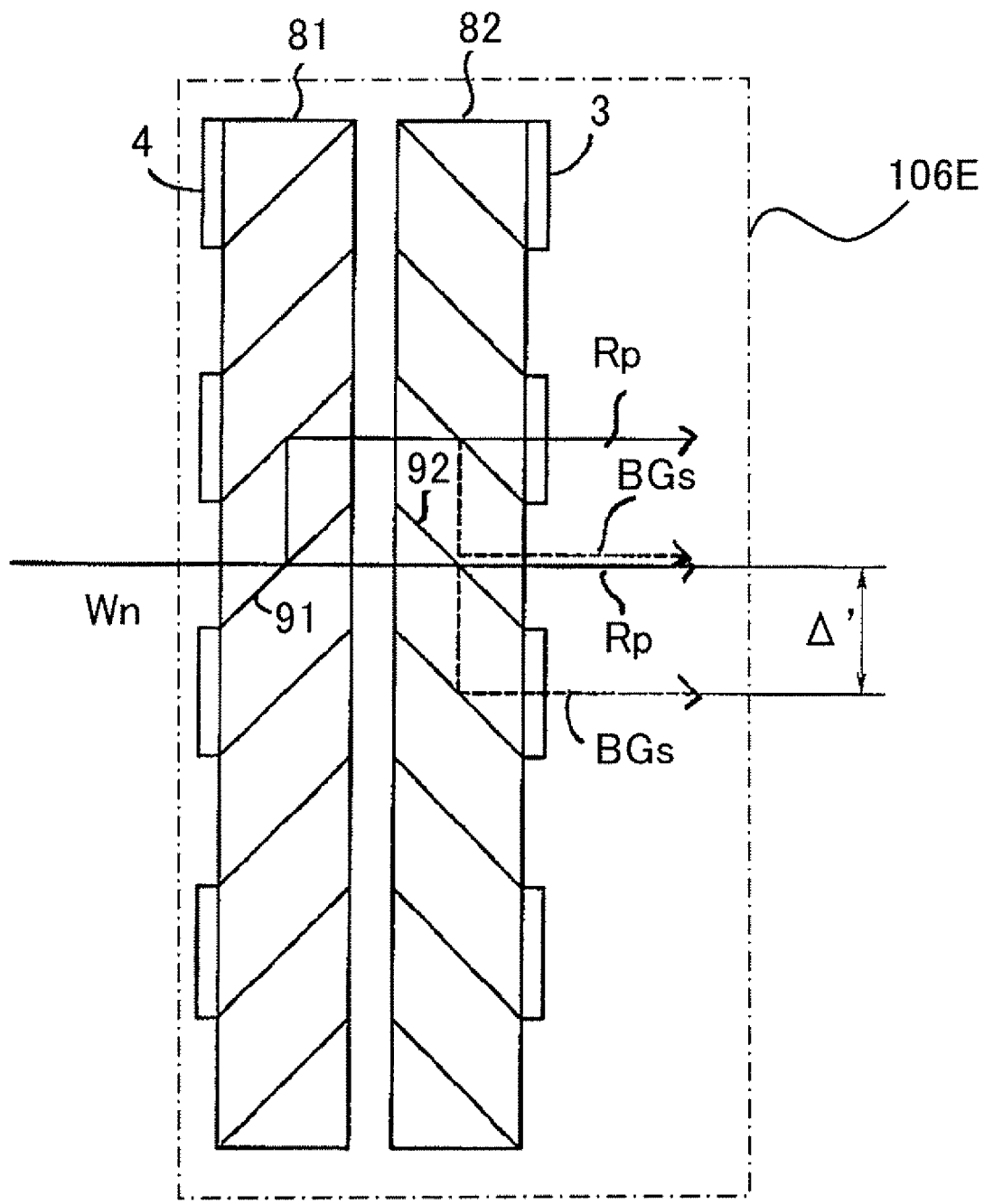
FIG. 17 is a sectional view showing the configuration of a dichroic polarization conversion array that is Embodiment 5 of the present invention.

FIG. 17 illustrates a dichroic polarization conversion array that is a fifth embodiment (Embodiment 5) of the present invention. In this dichroic polarization conversion array 106E, polarization splitting films 91 in a polarization splitting array portion 81 and dichroic films 92 in a dichroic array portion 82 are disposed so as to be inclined with respect to a light-entering direction in directions opposite to each other. That is, the polarization splitting film 91 and the dichroic film 92 are disposed to form an angle of 90° with each other. The optical function of the dichroic polarization conversion array 106E of this embodiment is identical to that of the dichroic polarization conversion array 106 of Embodiment 1.

The above configuration reduces the displacement amount between the separated light components ($\Delta$ in FIG. 4, and $\Delta'$ in FIG. 17: $\Delta' < \Delta$), so that the optical unit including the dichroic polarization conversion array 106E can be prevented from becoming larger in size.

As described above, each of the embodiments achieves a wavelength-selective polarization conversion element capable of efficiently using light and generating two wavelength region components having polarization directions different from each other from non-polarized light while having a compact configuration. Therefore, an illumination optical system, an optical unit and an image projection apparatus using the wavelength-selective polarization conversion element can efficiently use light from a light source to project bright images.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2007-161918, filed on Jun. 19, 2007, which is hereby incorporated by reference herein in its entirety.

What is claimed is:

1. A wavelength-selective polarization conversion element, comprising:
    a plurality of polarization splitting surfaces that is disposed along a first direction;
    a plurality of dichroic surfaces that is disposed along the first direction; and
    a plurality of phase plates that is disposed along the first direction,
    wherein the plurality of polarization splitting surfaces and the plurality of dichroic surfaces separate non-polarized white light into a plurality of first light fluxes and a plurality of second light fluxes, the first light flux including light of a first color as S-polarized light, light of a second color as S-polarized light and light of a third color as P-polarized light, and the second light flux including light of the first color as P-polarized light, light of the second color as P-polarized light and light of the third color as S-polarized light, and
    wherein the plurality of phase plates causes a polarization direction of one light flux in the first and second light fluxes to coincide with a polarization direction of the other light flux, and
    wherein the wavelength-selective polarization conversion element includes a plurality of substrates each having the polarization splitting surface and the dichroic surface formed alternately on the same surface, and the plurality of substrates are overlapped in a thickness direction so that the polarization splitting surface and the dichroic surface are displaced.

2. A polarization conversion element according to claim 1, further comprising in order from a light entrance side:
    a first element portion that includes the plurality of polarization splitting surfaces and a plurality of reflective films that reflects light reflected by the plurality of polarization splitting surfaces; and
    a second element portion that includes the plurality of dichroic surfaces and the plurality of phase plates.

3. A polarization conversion element according to claim 1, further comprising in order from a light entrance side:
    a first element portion that includes the plurality of dichroic surfaces; and
    a second element portion that includes the plurality of polarization splitting surfaces and the plurality of phase plates.

4. An illumination optical system, comprising:
    a lens array that divides light from a light source into a plurality of light fluxes;
    a wavelength-selective polarization conversion element according to claim 1 into which the plurality of light fluxes from the lens array enters; and
    a collective optical system that collects the plurality of light fluxes from the wavelength-selective polarization conversion element so as to overlap the light fluxes with each other on an illumination surface.

5. An image projection apparatus, comprising:
    an illumination optical system according to claim 4;
    three image-forming elements each of which forms an original image;
    a color separating/combining optical system that separates two wavelength region components having polarization directions different from each other entering from the illumination optical system into three light components having wavelengths different from each other to introduce the three light components to the three image-forming elements, and combines the three light components from the three image-forming elements; and
    a projection optical system that projects the combined light from the color separating/combining optical system onto a projection surface.

* * * * *